United States Patent [19]
Dahod et al.

[11] Patent Number: 5,430,872
[45] Date of Patent: Jul. 4, 1995

[54] VERIFYING MULTIMEDIA LINKING FOR A MULTIMEDIA PRESENTATION

[75] Inventors: Shabbir M. Dahod, Bellevue; Lori Sargent, Kirkland; Arthur T. Whitten, Duvall, all of Wash.

[73] Assignee: Asymetrix Corporation, Bellevue, Wash.

[21] Appl. No.: 31,008

[22] Filed: Mar. 12, 1993

[51] Int. Cl.⁶ .............................................. G06F 17/30
[52] U.S. Cl. ........................... 395/600; 364/963.3; 364/962; 364/DIG. 2
[58] Field of Search ............... 395/600, 700, 12, 154, 395/156; 364/DIG. 1, DIG. 2

[56] References Cited

U.S. PATENT DOCUMENTS

| | | | |
|---|---|---|---|
| 4,905,163 | 2/1990 | Garber et al. | 395/63 |
| 5,297,249 | 3/1994 | Bernstein et al. | 395/156 |
| 5,303,379 | 4/1994 | Khoyi et al. | 395/700 |
| 5,317,732 | 5/1994 | Gerlach, Jr. et al. | 395/600 |
| 5,339,392 | 8/1994 | Risberg et al. | 395/161 |
| 5,359,724 | 10/1994 | Earle | 395/425 |
| 5,367,621 | 11/1994 | Cohen et al. | 395/154 |

*Primary Examiner*—Thomas G. Black
*Assistant Examiner*—Maria N. Von Buhr
*Attorney, Agent, or Firm*—LaRiviere, Grubman & Payne

[57] ABSTRACT

The Check Multimedia Linking functionality provides a mechanism for users to verify that all media links to media elements in the current multimedia presentation are still valid. A media link is valid if the media element (media file or external data as in CD data) can be located. If a media element cannot be located, the check media links feature of the present invention allows users to remedy invalid media links by either locating one or more specific media elements, or by changing (adding) a path to the current search path that the media manager uses to locate media elements. Additionally, the user has the option of disabling a media element if the link cannot be found. A disabled media element will not show up in the check links list in the next verification search.

4 Claims, 5 Drawing Sheets

Tools:

VERIFYING MULTIMEDIA LINKING FOR A MULTIMEDIA PRESENTATION

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The present invention relates to the verification of links between objects and multimedia and, more particularly, to a computer system for determining that all media links to media elements in a multimedia presentation are still valid, and if not, to provide options for the correction thereof.

BACKGROUND ART

By using a computer as a slide projector, a number of special effects are employed in multimedia presentations. The special effects are produced by what is known as multimedia files in which are stored sound effects, video, animation, and the like. Typically, a multimedia presentation comprises a sequence of computer screens organized in slide format. Each slide has on it what are termed objects. Anything may be an object. The objects are linked to multimedia files that contain audio or visual information. Typically, the multimedia files are stored in digital form, although they may be stored in analog form if the appropriate interface equipment and drivers are provided. Typically, the presentation includes only a reference to a segment of any media source or file. These are called clips. Only the reference may be stored in the presentation file. The multimedia files are usually vendor-supplied and are accessed by way of a Media Manager. Clips are start and end position references to a multimedia file. Defining a clip determines the starting and ending points in a multimedia file or device. The term "linking" is analogous to message sending. An object is said to be "linked" to another object when it sends a message to it. An example of linking could be, "When Button 1 Mousedown, Play Animation of Circle 1." Button 1 is linked to Circle 2.

Occasionally, when a presentation is taken to the field, the presenter will discover during the presentation that a particular link can not be found. For example, when a button is clicked on a certain slide, music is supposed to be played from a particular MIDI (Musical Instrument Digital Interface) file. The presenter clicks the button, and the presenter is embarrassed to find that no music plays. Either the MIDI file has been lost, the multimedia link has been broken, or the file is hidden in a directory not currently being searched by the Media Manager when it goes through the directories in the drive path.

DISCLOSURE OF THE INVENTION

Accordingly, it is a feature of the present invention to provide a mechanism for users to verify that all media links to media elements in a given presentation are still valid. A media link is valid if a media element such as a media file or external data as in CD (compact disc) data can be located. If a media element cannot be located, the present invention allows users to remedy invalid media links by either locating one or more specific media elements or by changing (adding) a path for the Media Manager to search for media elements to the current search path that the Media Manager uses to locate media elements. Additionally, the user has the option of disabling a media element if the link cannot be found. A disabled media element will not show up in the check links list the next time the search is invoked. All changes made to either the media element or the Media Manager search path are persistent—that is, they are stored with the presentation data. For example, if the file c:\compel\src\exe\song.wav cannot be found and the user locates the media element using the present invention to point to d:\music\song.wav. The media element stored in the presentation now points to d:\music\song.wav and not the previous location (e.g. c:\compel\src\exe\song.wav).

BRIEF DESCRIPTION OF DRAWINGS

For a fuller understanding of the present invention, reference is made to the accompanying drawing taken in conjunction with the following detailed description of the Best Mode For Carrying Out the Invention. In the drawing.

Figure 1:
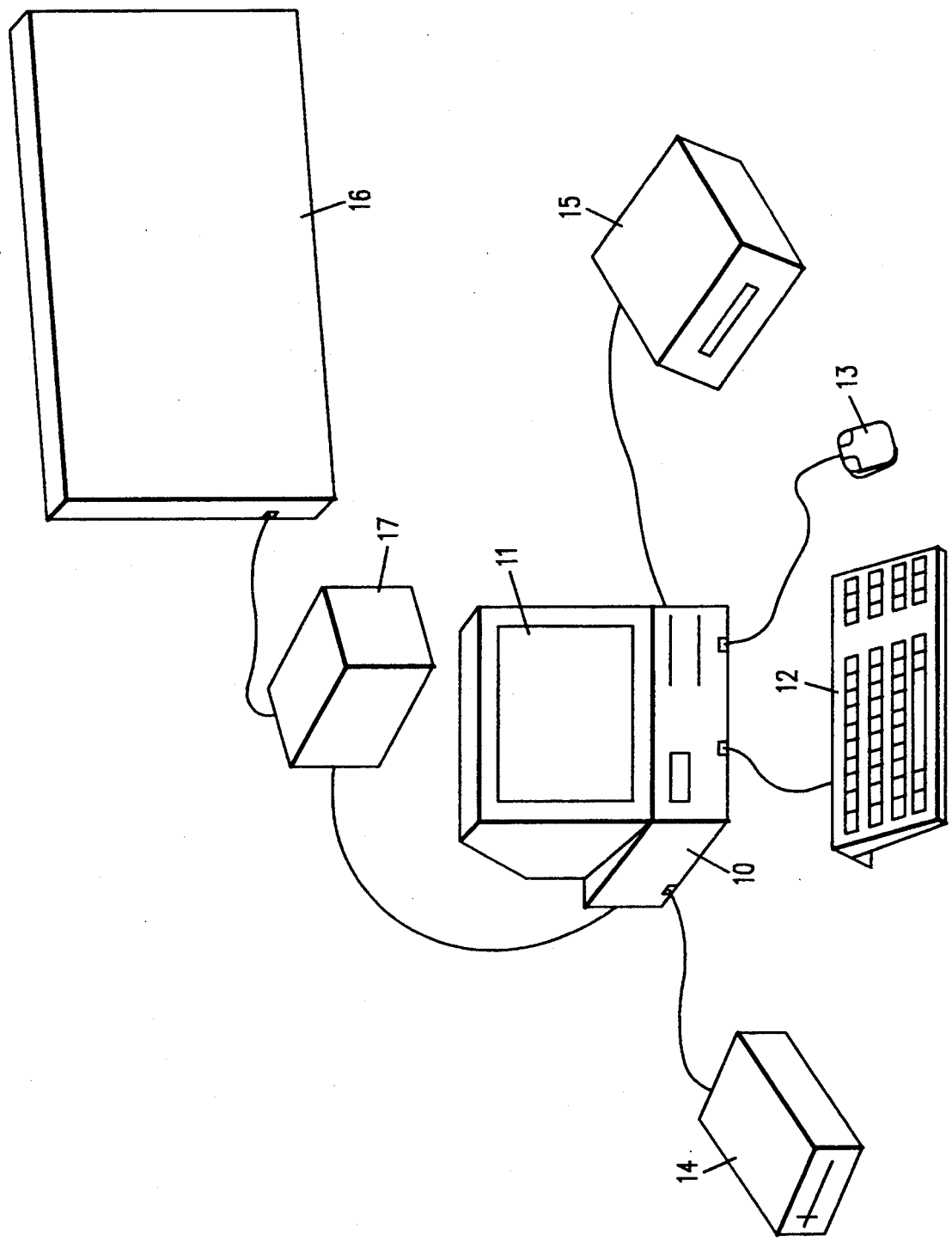
FIG. 1 is a perspective view of a location in which a computerized multimedia presentation may be given.

Reference numbers refer to the same or equivalent elements of the present invention throughout the several figures of the drawing.

BEST MODE FOR CARRYING OUT THE INVENTION

FIG. 1 is a perspective view of a location in which a multimedia presentation may be given. This location may be a customer's conference room or a hotel meeting room, for example. FIG. 1 illustrates a number of individual elements connected together for the presentation. A computer 10 is the primary element, and is provided with a viewing screen 11, a keyboard 12, a pointing device such as a mouse 13, a disk drive 14 for a floppy disk or a computer diskette, and a drive 15 for a CD ROM. The computer 10 may be a conventional personal computer such as an IBM PC having MS DOS 3.1, a 20 MHz 80386 SX processor, a hard disk with at least 4 MB of disk space, and at least 2 MB of RAM. All of the foregoing elements are easily carried to the presentation site. The presentation itself may be brought to the meeting recorded on floppy disks for use in the disk drive 14 or recorded on CD ROMs for use in the drive 15.

Although it is not a necessity, it may be desirable to have a large screen 16 disposed in the room where the presentation is to be given. The large screen 16 may have a driver unit 17 coupled to the computer 10 and to the screen 16. In other situations, projection means (not shown) may be available for projecting images from the screen 11 of the computer 10 onto a larger screen.

A multimedia presentation delivers its message with music, voice-overs, vivid images, and motion in addition to text and graphics. Sound may be produced in a Wave Audio File, a MIDI (Musical Instrument Digital Interface) file, and CD Audio formats. Video may be provided in digital file format or in video disk overlay. If Windows 3.1 is used, animation may be provided in file formats that are compatible with a standard known as the Media Control Interface (MCI) standard, since Windows 3.1 provides the MCI and, in addition, provides three MCI drivers: one controls the MIDI sequencer, one controls sound for Wave Audio Files, and one controls sound for CD Audio devices. The Windows instruction manual is hereby incorporated by reference as if fully set forth herein. The document is entitled: "The User's Guide for the Windows Graphical Environment, MS DOS Operating System", copyright 1990–92, by Microsoft Corporation.

Figure 2:
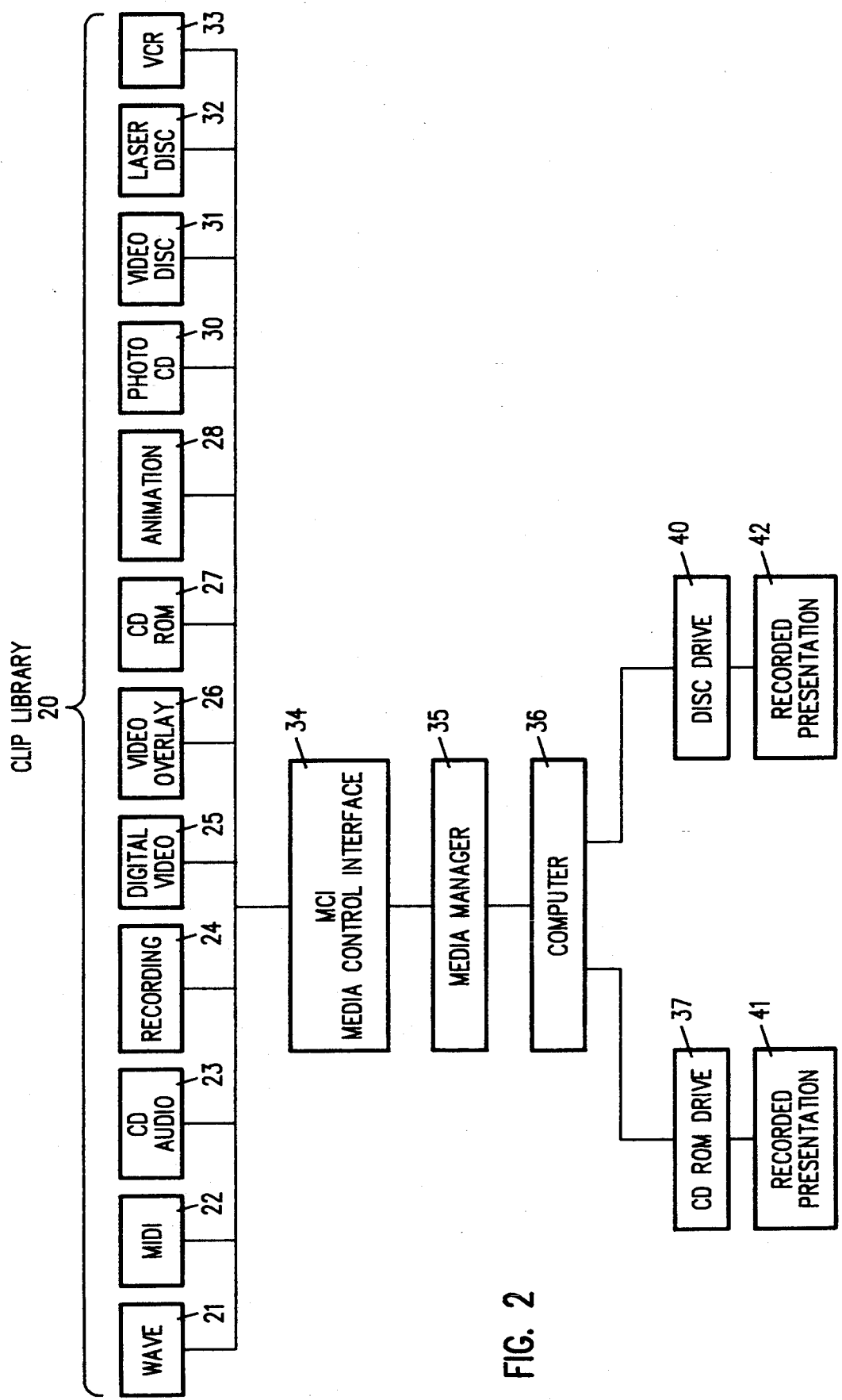
FIG. 2 is a block diagram illustrating the elements used in preparation of a multimedia presentation with the appropriate sound or visual clips employing a Vendor-Supported Clip Library and a Media Manager.

Referring now to FIG. 2, the presentation may be prepared ahead of time with the appropriate sound or visual clips in conjunction with a Vendor-Supported Clip Library 20. It should be understood that the Vendor-Supported Clip Library 20 is a standard commercial item, and is readily available. It is not typically transported to the presentation site. It may be available on a network, such as an E-Mail Network. The Clip Library 20 is a part of a CDB (Central Data Base). The segments of clips necessary to a presentation may be copied onto the presentation disk. For example, 3 seconds of a 10-second video clip may be copied.

FIG. 2 illustrates a typical Vendor-Supported Clip Library 20. The Clip Library 20 involves interface equipment that stores, plays or supports Wave 21, MIDI 22, CD Audio 23, Audio Recording Equipment 24 that digitizes an audio waveform and stores it for use in voiceovers and the like, Digital Video 25, Video Overlay 26, CD ROM 27, Animation 28, Photo CD 30, Video Disk 31, Laser Disk 32, and VCR 33. Bit Map Graphics may be employed to provide visual images. A Media Control Interface (MCI) 34 may be present as well as a Media Manager 35. The Media Manager 35 provides the information needed for triggering the playing of the clips by a computer 36. Again, the computer 36 may be a conventional personal computer such as an IBM PC, for example. The computer 36 organizes the information from the Clip Library 20 and integrates it with the triggers that call up the playing of the clips at the appropriate time, and records the information in a compressed format on a CD ROM by way of a CD ROM drive 37, or on a floppy disk by way of a disk drive 40. The complete computerized presentation of a slide show, including multimedia linking, is provided on a CD ROM recorded presentation 41, or on a floppy disk recorded presentation 42. These disk-format presentations 41, 42 are used with the system of FIG. 1 to make the presentation at the presentation site.

Figure 3:
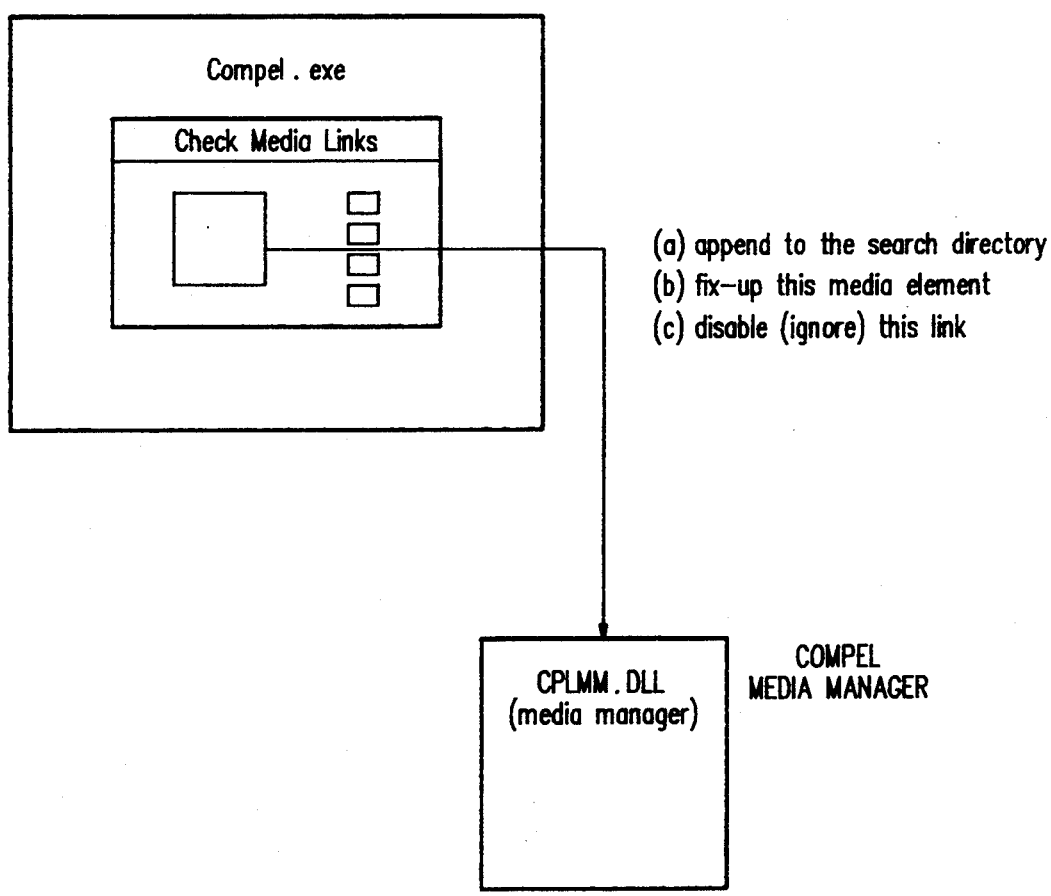
FIG. 3 is a diagram illustrating the functional relationship between a Media Manager, an exemplary embodiment of a presentation program, and a check media links screen.

In accordance with the present invention, prior to making a demonstration, the presentation is checked to verify that all multimedia links are in order. A media link is valid if a media element such as a media file or external data can be located. If a media element cannot be located, the present invention allows users to remedy invalid media links. Referring now to FIG. 3, an exemplary presentation system known as Compel is illustrated in a functional diagram. It will be understood that reference to Compel software is made by way of example only for purposes of illustrating the operation of the present invention. The block at the upper part of the diagram shown in FIG. 3 indicates that the presentation program is identified as Compel.exe. The block at the lower right of FIG. 3 indicates that the Media Manager is known as CPLMM.DLL. This identifies Compel Media Manager, Dynamic Link Library. When the screen entitled "Check Media Links" is invoked, the screen is as shown in the center of the upper rectangle. As shown to the right, it provides a menu comprising three selections: (a) append to the search directory; (b) fix-up this media element; and (c) disable (ignore) this link.

Figure 4:
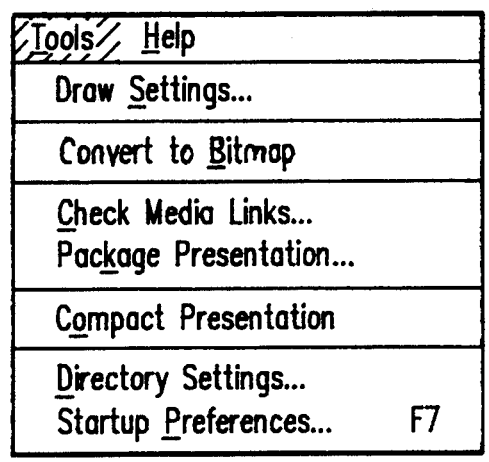
FIG. 4 is a tool menu screen from which the check media links screen may be invoked.
Figure 5:
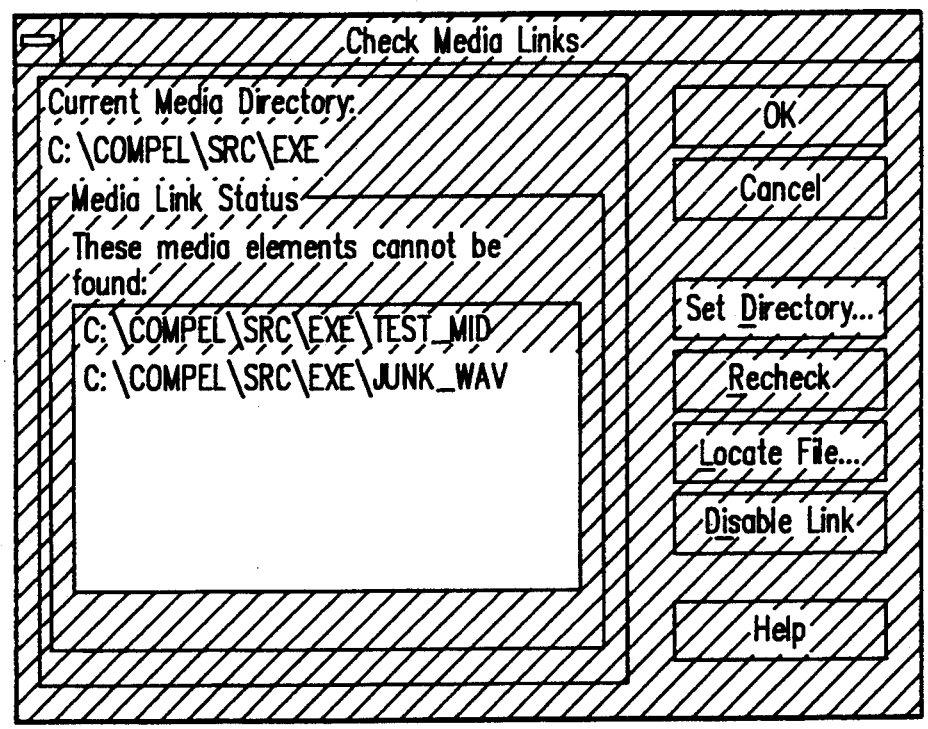
FIG. 5 is a check media links screen.

FIG. 4 is a screen showing the Compel "tools" menu. A screen called the check media links screen, shown in FIG. 5, is invoked via the Compel tools menu of FIG. 4. Check Media Links is available from both edit and playback mode. In Edit mode the check media links option is available from the Tools Menu. When invoked from playback mode the check media links options is located on the systems menu.

Additionally, Check Media Links is available in the runtime version of Compel, known as CplShow. In CplShow, the check media links option is only available from the system menu. Since no presentation file saving occurs when running the playback only version (cplshow), any media link fixups applied by the user are transient. That is, they only effect the presentation to which they were applied while the presentation is loaded. Check Media links changes are not stored with the presentation in this case.

In the example shown in FIG. 5, two media files cannot be found. The first is identified as C:\Compelsac\exe\test\mid, and the second is identified as C:\Compel\sac\exe\junk.wav. The screen of FIG. 5 indicates that the Media Manager looked for a particular MIDI file and was not able to find it and also looked for a particular Wave Audio file and was not able to find it. The Media Manager looks in different directories in the drive path. The possibilities are that the files are not present, or that they are hidden in a directory that is not in the path that the Media Manager is examining.

Ordinarily, media files are searched for by the Media Manager in the following order:
1. The path where the media file was last found during this presentation.
2. The explicit path for the file as defined in the media link.
3. The default directory for media files as set in the check media links dialog box.
4. The current working directory.
5. The directory in which the Windows software is installed.
6. The directory in which the Windows system files are installed.
7. The directory in which the Compel.exe file or cplshow.exe file is installed.
8. All directories in the PATH statement of the systems AUTOEXEC.BAT file.
9. Any CD-ROM drive using the explicit path.

It should be apparent that during an on-screen presentation, if the Media Manager cannot find a media file or device, the media clip will not play. A media link is valid if the media file or device can be located. If the media file or device cannot be located, the check media links feature of the present invention allows the presenter to remedy invalid media links by disabling the link, locating one or more specific media elements, or by adding a directory or path to the current search path that the Media Manager uses to locate media elements. Thus, the immediate options presented to the user is to: a) disable the link, b) locate the file, or c) set the directory which will be included in the search path for the Media Manager.

Figure 6:
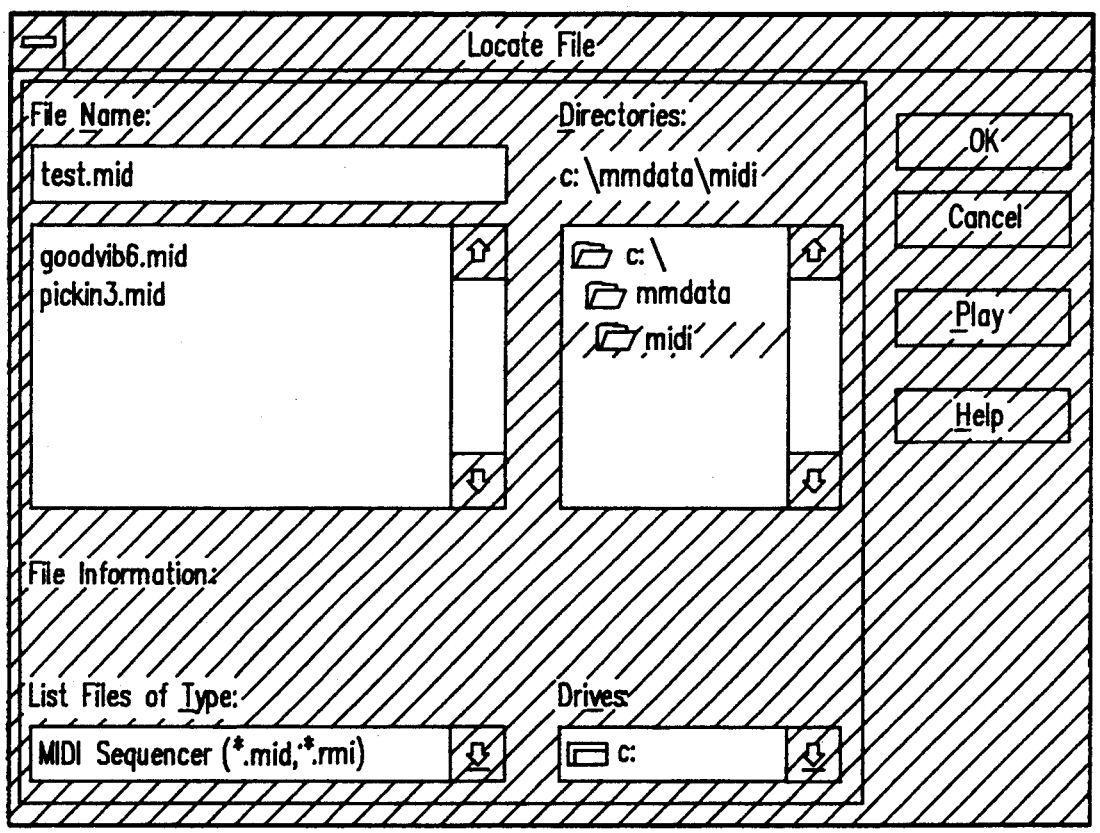
FIG. 6 is a locate file screen.
Figure 7:
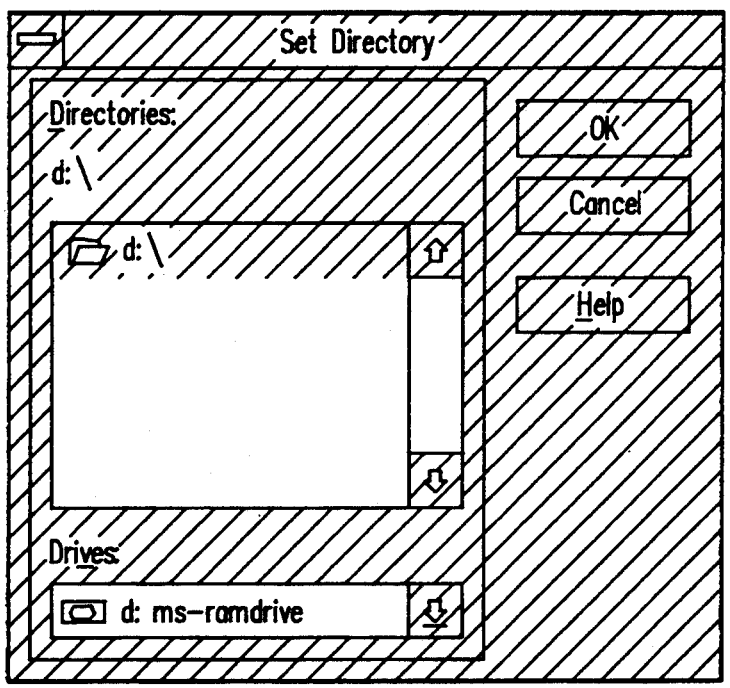
FIG. 7 is a set directory screen.

If option b) is chosen, then the user is presented with a locate file screen as shown in FIG. 6. FIG. 6 shows that the file named test. mid is located in goodvib6.mid and in pickin3.mid. It also indicates that those files may be found in drive c. Thus, the user can use the locate file screen of FIG. 6 to point to the missing media element. If c) is selected, the user is presented with the option of adding a directory or path to the current search path where the Media Manager searches for files. The user does this by selecting a path in the set directory screen of FIG. 7.

If it is desired to temporarily disable a broken media link, the following steps are followed:
1. From the tools menu, choose check media links, or in slide show view or Compel show, press Alt+space bar to display the control menu, then choose check media links.
2. Under media link status, select the broken link.
3. Click disable link. The disable link button leaves the media link intact, but prevents Compel from playing the clip in slide show view or Compel show.
4. Click OK. The media link remains disabled until you both restore the media file referenced by the clip and display the check media links dialog box again, which re-enables the media link.

To reconnect a broken media link, the following steps are followed:
1. From the tools menu, choose check media links. Or in slide show view or Compel show, press Alt+space bar to display the control menu, then choose check media links.
2. Under media link status, select the broken link.
3. Click locate file. The locate file dialog box appears, in which you can search your directories for the media file referenced by the clip. The locate file box is the screen shown in FIG. 6.
4. When you have found the file, click OK. The check media links dialog box reappears where the media links status now displays the message "all media elements found".
5. Click OK.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

The following Tables 1-3 are Warnier/Orr diagrams for the check media link portion of the Compel software used herein as an example. These are functional diagrams conventionally employed in the computer industry to indicate computer programming in much the same way that pseudo code is employed.

TABLE 1

WARNIER/ORR DIAGRAM
CHECK MEDIA LINKS

```
        ( Allocate Resources        ( Get current default Multimedia Directory
        (                           (
        ( Initialize Local Data     ( Enumerate all media elements in stream associated
  Init  (                           ( with current presentation
        (
        ( Check Links               ( (a)
        ( Update UI
        (              (            (       (              ( Yes  ( store old name
        (              (            (       (              (      ( set new name
        (              (            (       ( Dirty        ( (+)
        (              (            (       ( ?            (
  (a)   (              (            ( NO (                 ( No   ( skip
        (              (            (       ( Multimedia
  Check ( 0 - Num      (            (       ( Element Open Name    ( (b)
  Links ( Media        ( Locate     (       (
        ( Elements     ( File       ( (+)
        (              ( ?          (
        (              (            (       (              ( Yes  ( enable
        (              (            (       (              (
        (              (            ( Yes ( Disabled ?     ( (+)
        (              (            (       (              (
        (              (            (       (              ( No   ( do nothing
```

TABLE 2

WARNIER/ORR DIAGRAM (Continued)
CHECK MEDIA LINKS

```
                (                    ( Yes       ( Return file name
                (                    (
                ( File Name in Cache ( (+)
                (                    (
                (                    ( No        ( Skip
                (
                (                    ( Yes       ( Return file name
                ( File Found in      (
                ( Explicit File Path ( (+)
                (                    (
```

TABLE 2-continued

WARNIER/ORR DIAGRAM (Continued)
CHECK MEDIA LINKS

| | | | |
|---|---|---|---|
| Multimedia Get Open File Name [1] | ( ( ( File Found in ( Default Multimedia ( Directory ( ( ( ( ( File Found in ( System Path ( ( ( ( For each ( CD ROM Drive ( ( ( ( Return File Not Found | ( ( Yes ( ( (+) ( ( No ( ( Yes ( ( (+) ( ( No ( ( ( File Found ( on Drive ( ( | ( No ( Skip ( Return file name ( Skip ( Return file name ( Skip ( Yes ( Return file name ( (+) ( ( No ( Skip |

[1] Code Resides in media manager DLL

TABLE 3

WARNIER/ORR DIAGRAM (Concluded)
CHECK MEDIA LINKS

| | | | |
|---|---|---|---|
| Browse Locate | ( ( ( Get New Location ( ( ( ( Check Links ( ( Update UI | ( Yes ( ( (+) ( ( No ( (a) | ( Set Dirty Flag ( Continue ( Return |
| Set Default MultiMedia Directory | ( ( ( Get New ( Directory Name ( ( ( Check Links ( ( Update UI | ( Yes ( ( (+) ( ( No ( (a) | ( Continue ( Return |

We claim:

1. For a programmed computer having memory, means for storing and retrieving files and data, a multimedia directory and media links corresponding to media elements, a process for providing conditions and altering the conditions of the media links for a single multimedia presentation, the media links being the old names identifying locations to the media elements, the media elements being information associated with the single multimedia presentation, the process comprising the steps of:

obtaining the multimedia directory;

enumerating all of the media elements in the single multimedia presentation to provide a numbered listing of enumerated media elements;

locating the media links in the multimedia directory corresponding to the enumerated media elements for determining ones of the media links corresponding to the enumerated media elements which are presently invalid media links;

determining the conditions of the invalid media links, the conditions including disabled and open name;

enabling selected ones of the invalid media links having the disabled condition;

locating the enumerated media elements having the open name condition;

storing the old names of selected ones of the invalid media links having the open name condition;

setting new names to the selected ones of the invalid media links having the open name condition; and using the new names for accessing the selected ones of the invalid media links having the open name condition.

2. A process, as in claim 1, wherein the step of locating the enumerated media elements comprises the step of browsing through the memory of the programmed computer for the invalid media links to determine the new names.

3. A process, as in claim 2, wherein after the step of browsing the step of locating the enumerated media elements comprises the step of setting flags after finding ones of the invalid media links with the open name condition.

4. A process, as in claim 3, wherein after the step of setting the flags the step of setting the new names comprises the step of adding a directory to a current search path.

* * * * *